United States Patent

[11] 3,622,404

| [72] | Inventor | Leonard E. Thompson<br>961 N. W. Dale Ave., Portland, Oreg. 97229 |
|---|---|---|
| [21] | Appl. No. | 800,666 |
| [22] | Filed | Feb. 19, 1969 |
| [45] | Patented | Nov. 23, 1971 |

[54] METHOD AND APPARATUS FOR STRESS RELIEVING A WORKPIECE BY VIBRATION
8 Claims, 8 Drawing Figs.

| [52] | U.S. Cl. | 148/12.9 |
|---|---|---|
| [51] | Int. Cl. | C21d 1/04 |
| [50] | Field of Search | 148/12.9 |

[56] References Cited
UNITED STATES PATENTS
1,373,589   4/1921   Blood   148/12.9

FOREIGN PATENTS
365,033   1/1932   Great Britain   148/12.9
365,034   1/1932   Great Britain   148/12.9

Primary Examiner—L. Dewayne Rutledge
Assistant Examiner—W. W. Stallard
Attorneys—Daniel P. Chernoff and Jacob E. Vilhauer, Jr.

ABSTRACT: A method of stress relieving a workpiece by vibrating the workpiece in the frequency range of each resonant peak corresponding to each portion of the workpiece to be stress relieved and maintaining the vibration in the frequency range of each selected resonant peak while the amplitude of the peak increases, the power necessary to produce the peak decreases, and the frequency range decreases until the power necessary to produce the amplitude has substantially stabilized. An apparatus for carrying out the method including a vibrator, an accelerometer and an electric control and monitoring circuit comprising means for indicating the frequency and the amplitude of the vibration impressed on the workpiece and the power needed to produce the amplitude.

PATENTED NOV 23 1971 3,622,404
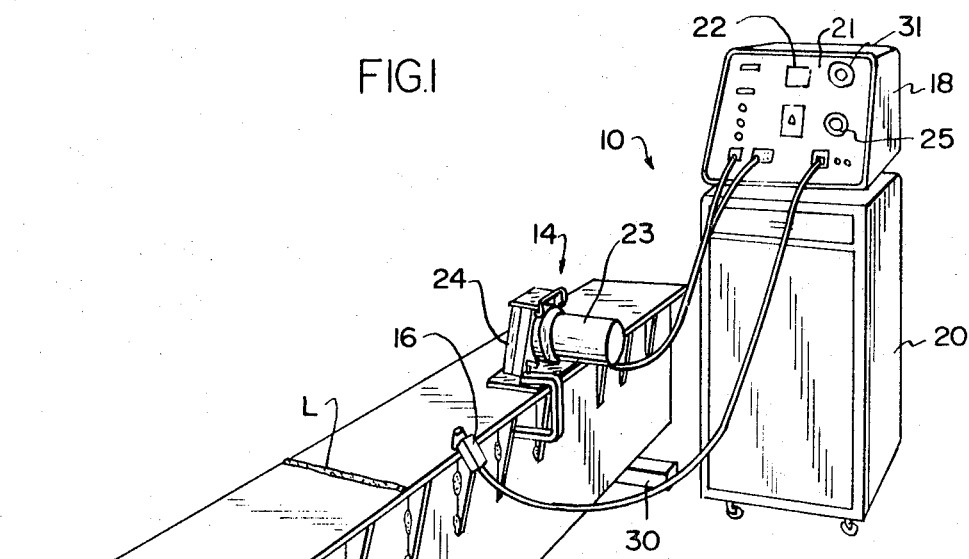
FIG.1
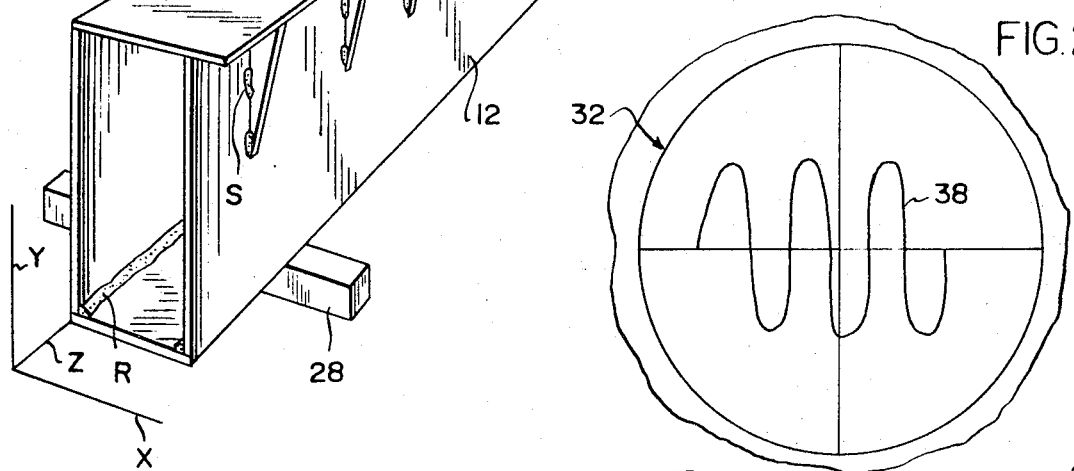
FIG.2
FIG.3
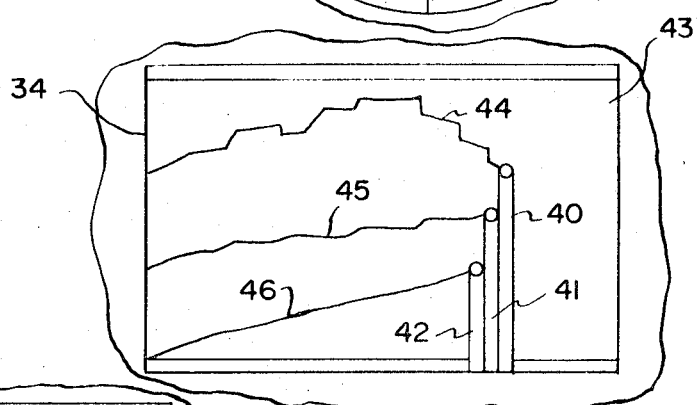
FIG.4
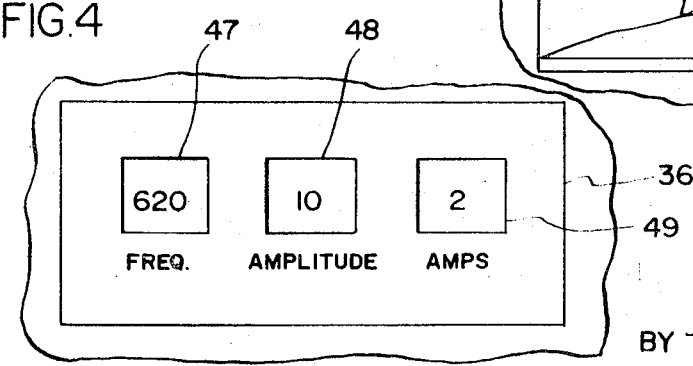
INVENTOR.
LEONARD E. THOMPSON
BY Griest, Lockwood,
Greenawalt & Dewey.
ATTORNEYS.

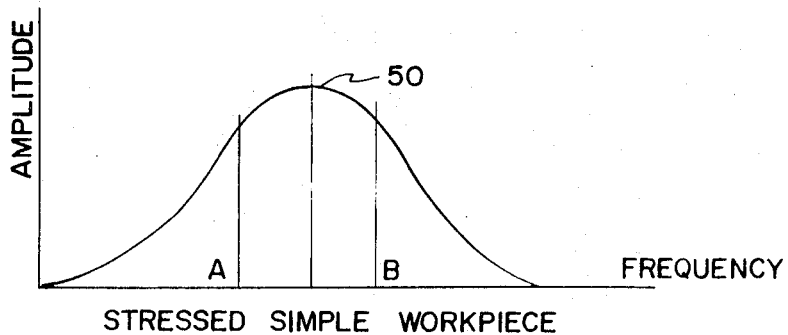
FIG.5 — STRESSED SIMPLE WORKPIECE
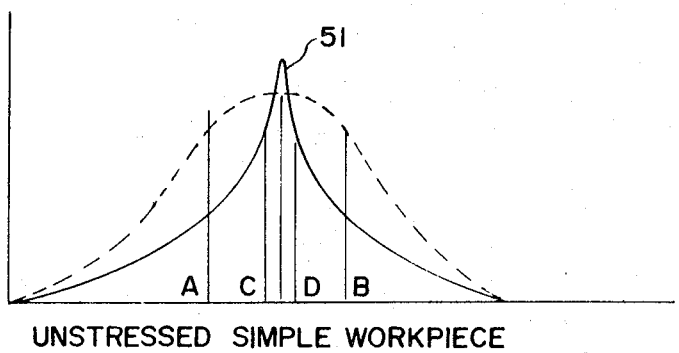
FIG.6 — UNSTRESSED SIMPLE WORKPIECE
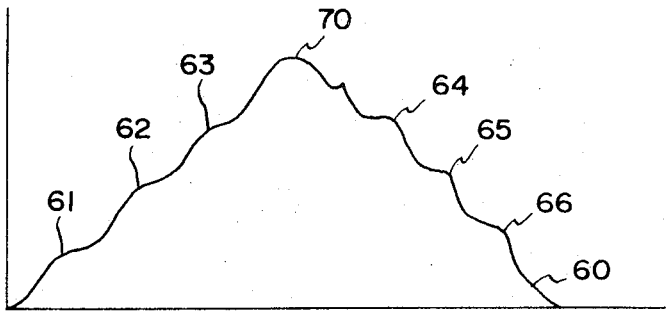
FIG.7 — STRESSED COMPLEX WORKPIECE
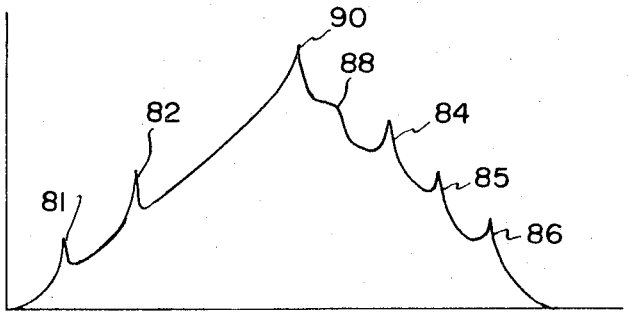
FIG.8 — UNSTRESSED COMPLEX WORKPIECE
INVENTOR.
LEONARD E. THOMPSON

METHOD AND APPARATUS FOR STRESS RELIEVING A WORKPIECE BY VIBRATION

BACKGROUND OF THE INVENTION

1. Field of the Invention

The field of this invention is a method and apparatus for stress relieving a workpiece by vibrating the workpiece. The field of the invention is also that of a method for stress relieving a workpiece by vibrating the workpiece in the frequency range of each resonant peak for each part of the workpiece to be relieved. The field of the invention is also that of an apparatus for vibrating a workpiece and for monitoring the frequency and amplitude of the vibration impressed on the workpiece and the power needed to produce the amplitude.

2. Description of the Prior Art

In all of the basic metalworking procedures such as forging, casting, welding and machining residual stresses are induced in the metal workpiece as a direct result of the work performed upon the workpiece. These residual stresses represent a preload on the workpiece which limit the additional working load capacity of the workpiece. They also materially increase the rate of corrosion of the metal in a corrosive atmosphere and may lead to the distortion of the workpiece during subsequent machining or fabrication operations due to the residual stresses overcoming the natural resistance of the parts of the workpiece to movement.

At one time, to relieve the stresses in metal workpieces, the workpieces were placed in an outside yard for a period of aging. Daily changes in the outside temperature would cause the metal workpiece to expand and contract, e.g. it would expand during the day and contract at night. During this movement of the metal the stresses were gradually relieved as the grain structure assumed a stable position. However, this method of stress relieving took a very long time and one could not always be certain that all stresses were relieved. Furthermore, rust and other forms of corrosion would form on the part and had to be removed before the part could be incorporated in a final assembly. A faster, but still relatively slow method is by heating. However, some parts which cannot be adequately heat treated are still stress relieved by placing them in an outside yard for a period of time.

The most common means for stress relieving a metal workpiece is by heating. However, this method is time consuming, costly and frequently creates additional problems in the dimensional stability of the workpiece and the preparation of the surface of the metal for further working. Presently, stress relief, redistribution or elimination by heating is obtained by carefully heating the metal workpiece to a point where the metal becomes semiplastic whereby the stresses are able to move the grain structure sufficiently to relieve the stress. In this method the workpiece must be carefully supported in place to keep the metal workpiece from "wilting" due to the weight of the unsupported portions thereof. The workpiece is then cooled slowly. As it cools the thinner parts of the workpiece cool more rapidly and again a certain amount of stresses are built back into the workpiece. At the conclusion of this process the metal workpiece must be cleaned to remove the scales formed during the heat treatment.

Another form of stress relief is by vibration. Vibratory stress relief as practiced in the past has been only moderately effective due to the fact that the frequency selected for treatment was either a random frequency applied indirectly to the workpiece through vibratory table, or the metal workpiece was vibrated directly at the basic resonant frequency of the metal workpiece for an empirical and/or arbitrary period of time based on the weight of the workpiece. The resonant frequency is the frequency at which a part will vibrate or oscillate when subjected to an impact or blow. This frequency is also referred to as the natural or characteristic frequency of the decaying oscillation. At the resonant frequency of a metal workpiece the resonant frequencies of all parts of the workpiece are mathematically related. However, when the workpiece is subjected to intense vibration at the resonant frequency of the workpiece to relieve stresses in the strongest parts of the workpiece, it is possible that some of the very weak parts or portions of the workpiece may be overworked. Therefore, the prior methods for vibratory stress relief have not been altogether satisfactory.

Outside of the laboratory, there is no known way to accurately know that stress relief has been attained during the relieving process using any of the stress relief methods in common practice today. The only way the workpiece can be checked is by either cutting it apart to measure the movement of one portion of the workpiece with respect to another, or by subjecting the workpiece to subsequent machining operations to test the dimensional stability of the metal workpiece.

In the past a part was sometimes stress relieved in different ways to learn the best manner for stress relieving the workpiece. After numerous workpieces had been treated in a particular manner, a historically vindicated pattern of treatment has been established. Then it was assumed that if other identical workpieces were stress relieved in a similar manner stress relief of the workpiece would be obtained.

However, all parts of a complicated structure do not always contain stresses to the same level. Therefore, it is possible in the prior art methods of vibratory stress relief to treat one part of the workpiece more than is required to produce the degree of stress relief required. In other words vibration suitable for stress relieving a highly stressed part of a workpiece may cold work another part of the same workpiece to a degree which will reintroduce stresses to an undesirable level in that other part of the workpiece.

SUMMARY OF THE INVENTION

In view of the deficiencies in the prior art methods for stress relieving a workpiece, it is one object of this invention to provide a method for separately relieving the stresses in each individual part of the workpiece to be stress relieved.

Another object of this invention is to provide a method for stress relieving a workpiece by tuning a vibrator connected to the workpiece to the resonant frequencies for the individual parts of the workpiece to be stress relieved.

Another object of this invention is to provide a method for stress relieving a workpiece by vibration wherein one part of the workpiece can be vibrated more or less than another part of the workpiece.

A further object of this invention is to provide method for stress relieving a portion of a workpiece by vibrating that portion of the workpiece in a direction parallel to the stress in that portion of the workpiece.

It is also an object of this invention to provide a method for stress relieving a workpiece by vibration which takes a minimum of time to carry out.

It is also an object of this invention to provide a method for stress relieving a workpiece by vibration wherein any stresses induced into the workpiece by the vibration stress relief treatment can be easily detected and then relieved, thereby eliminating the danger of building up new stresses.

A further object of this invention is to provide a method for stress relieving a workpiece by vibration wherein a continuous record of the vibration treatment applied to the workpiece and the results of the treatment is maintained so that stress relief of the workpiece can be verified.

It is still another object of this invention to provide an apparatus for stress relieving a workpiece by vibration which includes means for indicating the frequency and amplitude of the vibration impressed on the workpiece and the power needed to produce the amplitude.

A still further object of this invention is to provide an apparatus for stress relieving a workpiece having a continuous tape readout indicating the frequency of the vibration, the amplitude of the vibration and the power required to obtain the amplitude thereby providing a continuous record of the stress relief treatment applied to the workpiece and the manner in which the workpiece has responded to the stress relief treatment.

It is also an object of this invention to provide an apparatus for stress relieving a workpiece by vibration which is low in cost and which is mobile i.e., readily movable from workpiece to workpiece.

It is also an object of this invention to provide an apparatus for carrying out the method of this invention which unskilled labor can be trained to use in a very short time, e.g. an hour.

The invention achieves its objects and advantages including those inherent therein by providing a method for stress relieving a workpiece by vibration which method comprises the steps of: vibrating the workpiece in the frequency range of the resonant peak for each part of the workpiece to be stress relieved; and maintaining the vibration in the frequency range of each selected resonant peak while the amplitude of the peak increases, the power necessary to produce the peak decreases, and the frequency range decreases until the power necessary to produce the amplitude has stabilized. he invention also achieves its objects by providing an apparatus for stress relieving a workpiece comprising a vibrator adapted for attachment to the workpiece and operated by a series electric motor, an accelerometer adapted for attachment to the workpiece at a point spaced from the vibrator for measuring the amplitude of the vibration waveform impressed on the workpiece, and an electric control and monitoring circuit including means for indicating the frequency and the amplitude of the vibration impressed on the workpiece and the power needed to produce the amplitude.

BRIEF DESCRIPTION OF THE DRAWINGS

FIG. 1 is a front perspective view of an apparatus for carrying out the method of this invention.

FIG. 2 shows one from of indicating means for the apparatus shown in FIG. 1;

FIG. 3 shows another form of indicating means for the apparatus shown in FIG. 1;

FIG. 4 shows still another form of indicating means for the apparatus shown in FIG. 1;

FIG. 5 is a graph of a theoretical amplitude versus frequency curve for a stressed simple workpiece;

FIG. 6 is a graph of a theoretical amplitude versus frequency curve for an unstressed simple workpiece;

FIG. 7 is a graph of an amplitude versus frequency curve of a stressed complex workpiece; and FIG. 8 is a graph of an amplitude versus frequency curve of an unstressed complex workpiece.

DESCRIPTION OF THE PREFERRED EMBODIMENTS OF THE INVENTION

Referring to FIG. 1, an apparatus for vibrating a workpiece is generally indicated at 10. A workpiece is indicated at 12. The apparatus 10 includes a vibrator 14, a sensing accelerometer 16, a cabinet 18 and a mobile supporting stand 20. The cabinet 18 includes a control panel 21 having means 22 thereon for indicating the amplitude and the frequency of the vibration and the power needed to provide the amplitude.

The vibrator 14 is of known type and includes a variable speed drive 23 which drives an eccentric (not shown) in the housing 24. The vibrator 14 is detachably clamped to the workpiece 12. In one embodiment of the invention the variable speed drive is series electric motor 23, e.g., of the commutator type having armature and field windings connected in series. Since the speed of a series electric motor can be controlled by varying the current to the motor, the frequency of the vibration impressed upon the workpiece 12 is controlled by varying the current to the motor 23. A power control means, preferably a variable transformer (not shown), is provided for this purpose, and includes an adjustment knob 25.

The workpiece 12 is generally supported on resilient strips 28 and 30 made of rubber or like material which allow the workpiece to move freely when the impressed vibration reaches the natural vibration frequency, i.e., the resonant frequency, of each part of the workpiece. The accelerometer 16 includes a transducer (not shown) of known type which translates the mechanical vibration into an electrical signal whereby a relative measurement of the amplitude of the vibration waveform can be made. The signal is fed to an amplifier (not shown) and the amount of amplification is controlled by knob 31. The accelerometer 16 is detachably secured to the workpiece at a point spaced from the vibrator 14.

The frequency of vibration of a part of a workpiece 12 is directly proportional to the speed of motor 23 while move freely power needed to produce the amplitude thereof is directly proportional to the current demand of the motor 23 and these can be measured by appropriate electrical measuring means (not shown) of known type such as a tachometer and an ammeter. The cabinet 18 contains an electrical control and monitoring circuit which includes the power control means connected between the motor 23 and a source of electric power. This circuit also includes the indicating means 22 which is connected to the power control means, and to the accelerometer for indicating the frequency and the amplitude of the vibration impressed on the workpiece and the power needed to produce the amplitude.

Heretofore apparatus for vibrating a workpiece to relieve stresses therein included an ammeter to indicate the power being fed to the motor of the vibrator and a resonance meter which indicated the amplitude of the vibration impressed upon the workpiece. A resonance level knob was provided, such as knob 31, to vary the level of amplitude indicated on the resonance meter. The resonance meter was located where indicating means 22 is located on control panel 21 of the apparatus of this invention. The frequency of the vibration would be indicated roughly by the position of the variable transformer adjusting knob 25.

In a prior art method of stress relieving a workpiece by vibration, the operator would turn knob 25 until the resonance meter indicted the point of resonance for the whole workpiece, i.e., point of maximum amplitude. If the level of amplitude was low the operator would adjust the level of the amplitude by turning the knob 31. The operator would then lock the vibrator into the resonant frequency and a timer would be set for vibrating the workpiece at the resonant frequency for the whole workpiece for a predetermined length of time. The predetermined length of time was based on prior experience with workpiece of varying weight. This time period for vibration at the apparent resonant frequency of the whole part was therefore chosen empirically and/or arbitrarily. Furthermore, after vibrating the workpiece at the chosen frequency for the predetermined time period, there was no known way of making certain, or of being certain, that all the stresses in the workpiece had been relieved.

Although perhaps noticed by some operators, no attention was paid to the fact that the amplitude, i.e. reading on the resonance meter, did not increase or decrease smoothly. In other words, it was believed that a curve of amplitude versus frequency would have a smooth rise and fall such as the curves shown in FIGS. 5 and 6. The fact that the needle of the resonance meter would fluctuate up and down the scale as it gradually moved to a point of maximum amplitude was attributed to problems in the electrical circuitry such as feedback, nonlinearities, the pickup of extraneous signals, etc. Also no significance was placed on the fact that the current did not rise and fall smoothly.

I have discovered, however, that the minor peaks indicated by fluctuating resonance meter appear to correspond to resonant peaks of individual parts or portions of the workpiece each of which, because of their configuration etc., will resonate at a different frequency than other parts.

Also I have discovered that the current necessary to produce a given amplitude in the range of a given resonance peak would decrease as the workpiece was vibrated. Furthermore, as the current decreases, the frequency range of the peak would decrease until it was almost impossible to tune the frequency of the vibration to that resonant peak. At this point the current would stabilize i.e., it would stop decreasing. This phenomena appears to be caused by the fact that the particular part of the workpiece which has a natural frequency of vibration i.e., point of resonance in the frequency range of the observed resonant peak, had internal stresses therein. Apparently, the stresses in and around that part of the workpiece prevented that part from vibrating freely at its resonant frequency. Also it appears that the increase in current in the frequency range of the resonant peak was caused by the resistance of the stresses in that part of the workpiece to the vibration. It appears therefore, that after vibrating the workpiece in the frequency range of the given resonant peak (ideally at the resonant frequency), the stresses are gradually relieved. This is indicated by the decrease in current and by the fact that the amplitude of the resonant peak increases while the frequency range of the resonant peak decreases, i.e. the resonant frequency (natural frequency of vibration) becomes more discrete or specific. It should be noted that many times a true resonant peak is not detected in a nonrelieved workpiece. Instead a plateau is detected which includes the true resonant peak. After the workpiece is stress relieved, only the true resonant peak is detectable and since the amplitude of the peak has increased the resonant peak is easily detected. When this occurs, sometimes it appears that the resonant frequency of the resonant peak has shifted. It is believed, however, that the resonant frequency does not shift but rather that the apparent shift is probably due to the lack of sensitivity of the instrumentation used and/or or to the inadequate repeatability of the settings of the vibration equipment. This phenomena can be better understood by comparing the stressed resonant peaks with the unstressed resonant peaks shown in FIGS. 7 and 8.

To carry out the method of this invention in the best manner, it is important to be able to compare the changes in the amplitude of the vibration and the changes in the power needed to produce the amplitude with changes in the frequency of the vibration. For this purpose indicating means 22 is provided comprising an oscilloscope readout means 32 as shown in FIG. 2 and/or a continuous scriber-tape readout means 34 as shown in FIG. 3 and/or a digital readout means 36 as shown in FIG. 4. The oscilloscope readout means 32 would show an equivalent waveform 38 of the vibration waveform impressed upon the workpiece.

In the scriber-tape readout means 36 three scribers 40, 41, and 42 move transversely of a tape 43 in response to changes in frequency and amplitude of the vibration waveform impressed on the workpiece and in response to changes in power needed to produce the amplitude. The tape moves horizontally at a constant speed whenever the vibrator is vibrating to provide a continuous record of the vibration stress-relieving treatment applied to a given workpiece and the results of said treatment. The scriber 40 indicates the changes in amplitude by line 44. The scriber 41 indicates the changes in current by line 45. And the scriber 42 indicates the changes in frequency by line 46.

The amplitude, frequency and power needed by the vibrator to produce the amplitude in the workpiece can be read directly from the digital readout means 36 at any given operating frequency. The frequency would be given in cycles per minute on digital indicator 47, the amplitude would be in terms of a voltage corresponding to the signal from the transducer of the accelerometer on digital indicator 48, and the power to produce the amplitude would be in amps or watts on digital indicator 49.

The digital readout means 36 could be used by itself or with the oscilloscope means 32 and/or the scriber-tape readout means 34. Also the scriber-tape readout means 34 could be used by itself or with the oscilloscope means 32.

Theoretically, if a workpiece has a simple symmetrical configuration, there will only be one natural or resonant frequency for all parts of the workpiece. In other words, each part of the workpiece will resonate only at the resonant frequency for the whole workpiece. The theoretical resonant peak for such a simple workpiece is shown at 50 in FIG. 5 and at 51 in FIG. 6. In FIG. 5 the resonant peak 50 is rounded which indicates that there are internal stresses within the workpiece. The frequency range of the resonant peak 50 of the stressed simple workpiece is between frequencies A and B. To relieve these stresses the operator would vibrate the workpiece between frequencies A and B. As the workpiece is vibrated in the frequency range of the resonant peak, the amplitude will decrease somewhat at the edges of the frequency range, or bandwidth of the resonant frequency, and will go up in the middle portion of the bandwidth. The power needed to produce the amplitude will decrease. Also the bandwidth of the resonant peak will decrease until it was almost nonexistent, i.e. it will be very small as indicated by frequencies C and D in FIG. 6. The amplitude of the resonant peak 51 in the band width between frequencies C and D in FIG. 6 will appreciably higher than the peak 50 in FIG. 5. Also the power needed to produce this amplitude will be less and will have stabilized. At this point the operator will know that the workpiece has been essentially stress relieved. This will be indicated on the oscilloscope redout means 32, on the scriber-tape readout means 34, and/or on the digital readout means 36.

FIG. 7 shows the amplitude versus frequency curve 60 for a stressed complex workpiece. It is to be noted that with complex workpiece different parts of the workpiece will have individual resonant peaks 61, 62, 63, 64, 65 and 66 due to the particular configuration of each part. These resonant peaks are not only different from each other but also different from the main resonant peak 70 for the whole workpiece.

In carrying out the method of this invention the operator vibrates the workpiece through a predetermined frequency range, preferably a frequency range of from 400 to 8,000 cycles per minute. The operator seldom tunes directly to the resonant frequency of the entire workpiece. Instead the operator will scan all the frequencies capable of being developed by the vibrator used. As the resonant peak of each individual part of the workpiece is reached it is logged or recorded by the operator together with the amplitude, the width of the resonant frequencies in cycles per minute, and the power drawn by the vibrator necessary to produce the amplitude, i.e. the amount of the deflection of the metal workpiece. Preferably the amperage drawn by the vibrator is recorded. After noting the apparent resonant peaks and the frequency range of those peaks for each part of the workpiece to be stress relieved, the operator will return to each peak to be stress relieved and then vibrate the workpiece in the frequency range of each apparent resonant peak for each part of the workpiece to be stress relieved. He will maintain the vibration while the amplitude increase and the frequency range decreases until the power necessary to produce the amplitude has stabilized.

As the workpiece is vibrated in the frequency range of each apparent resonant peak, the stress is gradually relieved and the amplitude (amount of movement of the metal) will increase rapidly at the specific resonant frequency, the range or band width of the resonant frequency will narrow, and the power necessary to produce the amplitude of the variation at the point of resonance will be materially reduced. After an adequate treatment time, the amplitude of the vibration at each resonant peak to be stress relieved and the power necessary to produce that amplitude will stabilize indicating that the workpiece is essentially stress relieved. This would be indicated by the peaks 81, 82, 84, 85 and, 86 and 90 of curve 80 in FIG. 8.

A continuous record of the frequency amplitude and power is taken manually or automatically. By using the scriber-tape readout means 34 as shown in FIG 3, a continuous record of the frequency, amplitude and power needed to produce the amplitude is obtained automatically. In this way an exact record of the vibration stress relieving treatment applied to a given workpiece and the results of the treatment is obtained.

Since each individual part of the workpiece having an individual resonant frequency is separately treated by vibration in the range of the resonant frequency particular to that part, the operator can check the response, i.e. the change in the frequency range or bandwidth of the resonant frequency and the change in power needed to produce the amplitude at each resonant peak, to determine how thoroughly each part of the workpiece has been stress relieved. In this way it is possible with the vibration stress-relieving method of this invention to selectively stress relieve an individual part of the workpiece to a greater or lesser degree by tuning the vibrator to the resonant frequency range of the individual part for a greater or lesser length of time as indicated by the response of that part to the stress-relieving vibration treatment. As a result, one is able to known that each and every part of the workpiece has been adequately stressed relieved and that no part has been subjected to excessive vibration treatment.

After treating each apparent resonant peak of each part to be stress relieved the operator will repeat the step of vibrating the workpiece through the predetermined frequency range and will note the change in amplitude of the vibration waveform with changes in frequency and the power necessary to produce the amplitude to determine if all stresses have been relieved and if any new stresses have been induced in the workpiece. It will be noted that a resonant peak corresponding to stressed peak 63 in FIG. 7 does not appear in FIG. 8. This phenomena appears to be caused by the fact that the internal stresses in the part of the workpiece corresponding to the apparent resonant peak 63 are of such magnitude and nature that they appeared as a distinct part of the workpiece, e.g. projection. Experiments have shown that these stresses are usually caused by welds or joints. Once the weld area has been stress relieved the apparent resonant peak 63 will disappear.

If any part of the workpiece is subjected to excessive vibration treatment to the extent that the part is cold worked there will be an increase in the power required to produce a given amount of deflection of the metal, i.e. amplitude of the vibration, in the resonance frequency range of this particular part of the metal workpiece. Such new stresses will be detected by the appearance of a rounded resonant peak, such as peak 88 shown in FIG. 8. To relieve the new mechanically induced stress the operator will reverse the direction of the vibration applied by the vibrator 14 to he workpiece 16 and than vibrate the workpiece for a short period of time in the frequency range of the resonant peak 88 until a satisfactory reduction of stress is obtained. On round or spherical workpieces it may be necessary to locate the vibrator on the opposite side of the workpiece in order to attain the elimination of mechanically induced stresses.

The vibration waveform impressed upon the workpiece includes a primary wave function in one plane, a secondary wave function developed in a plane normal to (i.e. at a right angle to) the plane of the primary vibratory wave function and a tertiary wave function developed in a plane normal to (i.e. at a right angle to) both the plane of the primary and the plane of the secondary wave functions. Referring to FIG. 1 the primary wave function will be in the YZ plane and will move along the Z-axis. The secondary wave function will be developed in the XZ plane and will move along the X-axis. The tertiary wave function will be in the XY plane and will move along the Y-axis. These three waves functions are sometimes referred to as the Rayleigh wave (primary wave function), the Love wave (the secondary wave function), and the Shear wave (the tertiary wave function). The Rayleigh wave causes retrograde elliptical movement of the particles in the path of the wave. The Love and Shear wave cause oscillating movement of the particles in their paths at right angles to their paths. Since the vibration waveform comprises wave functions in 3 different planes the workpiece can be vibrated in a particular direction by tuning the vibrator to the specific resonant frequency of a given part of the workpiece in which either the primary, secondary, or tertiary wave function of the vibration waveform applied is the resonant wave function. This is very important since it has been found that vibration stress-relieving treatment is quicker and more effective, i.e. more efficient, if the vibration impressed upon a workpiece is parallel to the stress in the workpiece. Consequently, it is possible to utilize these three functions in the stress-relieving treatment of residual stresses by tuning to the wave function which is parallel to the stress so that stress relief is accomplished with maximum efficiency and in the shortest period of time. Thus, referring to FIG. 1, to stress relieve weld R the operator will tune to a primary or Rayleigh wave function in the resonant frequency range for weld R. To stress relieve weld L the operator will tune to the secondary or Love wave function in that resonant frequency range. And to stress relieve weld S the operator will tune to the tertiary or Shear wave function in that resonant frequency range.

In some instances the internal stresses in the workpiece are the result of elastic deformation or elastic displacement of the molecules and vibration only in an amount necessary to cause elastic movement of the stressed molecules is necessary to move the molecules back to their normal or unstressed position in the crystal structure of the metal. In other instances the internal stresses on the molecules has caused plastic deformation of the molecules and vibration sufficient to continue the plastic deformation of the stressed molecules in the crystal structure is needed to move the molecules to an offset stable position wherein slip planes are created in the crystal structure of the metal.

I claim:

1. A method for stress relieving a workpiece by vibration comprising the steps of: vibrating the workpiece in the frequency range of the resonant peak for each part of the workpiece to be stress relieved; and maintaining the vibration in the frequency range of each selected resonant peak while the amplitude of the peak increases, the power necessary to produce the peak decreases, and the frequency range decreases until the power necessary to produce the amplitude has substantially stabilized.

2. A method as set forth in claim 1 wherein said workpiece is vibrated in a direction parallel to the stresses in said workpiece.

3. A method a set forth in claim 1 wherein the vibration waveform impressed on the workpiece includes a primary wave function in one plane, a secondary wave function developed in a plane normal to the plane of said primary wave function, and a tertiary wave function developed in a plane normal to the plane of said primary wave function and to the plane of said secondary wave function, and wherein the workpiece is vibrated in a direction parallel to the direction of a given stress by tuning the means for vibrating the workpiece to a resonant frequency of a given part of the workpiece in which the wave function moving parallel to said given stress is the dominant resonant wave function.

4. A method for stress relieving a workpiece by vibration comprising the steps of: vibrating the workpiece through a predetermined frequency range; recording the changes in amplitude of the vibration waveform and the power needed to produce the amplitude with changes in frequency; determining the frequency range of the resonant peaks for each part of the workpiece; vibrating the workpiece in the frequency range for each resonant peak to be stress relieved; and maintaining the vibration in the frequency range of each selected resonant peak while the amplitude increases, the power necessary to produce the peak decreases, and the frequency range decreases until the power necessary to produce the amplitude has stabilized.

5. A method as set forth in claim 4 wherein the predetermined frequency range is between 400 and 8,000 cycles per minute.

6. A method as set forth in claim 4 further comprising the step of: continuously recording the frequency, the amplitude, and the power needed to produce the amplitude, to provide a record of the vibration stress-relieving treatment applied to a given workpiece and the results of said treatment.

7. A method as set forth in claim 4 further comprising repeating the steps of: vibrating the workpiece through the predetermined frequency range; and recording the changes in the amplitude of the vibration and the power necessary to produce the amplitude with changes in frequency to determine if all stresses have been relieved and if any new stresses have been induced in the workpiece.

8. A method as se forth in claim 7 further comprising the steps of: determining the frequency range of the resonant peaks for the induced stresses; reversing the direction of the vibration applied; and vibrating the workpiece for a short time in the frequency range of the resonant peaks for the induced stresses until a satisfactory reduction of stress is obtained.

* * * * *

UNITED STATES PATENT OFFICE
CERTIFICATE OF CORRECTION

Patent No. 3,622,404        Dated November 23, 1971

Inventor(s) Leonard E. Thompson

It is certified that error appears in the above-identified patent and that said Letters Patent are hereby corrected as shown below:

| | | |
|---|---|---|
| Col. 1, Line 65 | After "through" insert --a--. |
| Col. 2, Line 21 | Change "workpiece" to --worpieces--; |
| Line 45 | After "provide" insert --a--. |
| Col. 3, Line 17 | Change "he" to --The--; |
| Line 33 | Change "from" to --form--. |
| Col. 4, Line 8 | Change "move freely" to --the--. |
| Col. 6, Line 56 | Change "variation" to --vibration--. |
| Col. 9, Line 4 | Change "se" to --set--. |

Signed and sealed this 16th day of May 1972.

(SEAL)
Attest:

EDWARD M. FLETCHER, JR.
Attesting Officer

ROBERT GOTTSCHALK
Commissioner of Patents